United States Patent
Lin

(10) Patent No.: US 10,499,453 B2
(45) Date of Patent: *Dec. 3, 2019

(54) METHOD AND DEVICE FOR BLUETOOTH CONNECTION CONTROL FOR MULTIPLE PLAYING DEVICES, AND MUSIC PLAYING SYSTEM

(71) Applicant: Guangdong Oppo Mobile Telecommunications Corp., Ltd., Dongguan, Guangdong (CN)

(72) Inventor: Shangbo Lin, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,419

(22) Filed: Nov. 20, 2018

(65) Prior Publication Data

US 2019/0090302 A1    Mar. 21, 2019

Related U.S. Application Data

(63) Continuation of application No. 15/371,963, filed on Dec. 7, 2016, which is a continuation of application No. PCT/CN2015/096068, filed on Nov. 30, 2015.

(30) Foreign Application Priority Data

Aug. 11, 2015 (CN) .......................... 2015 1 0490580

(51) Int. Cl.
*H04W 76/40* (2018.01)
*H04W 4/00* (2018.01)
(Continued)

(52) U.S. Cl.
CPC ............. *H04W 76/40* (2018.02); *H04W 4/00* (2013.01); *H04W 4/80* (2018.02); *H04W 76/10* (2018.02); *H04W 4/06* (2013.01)

(58) Field of Classification Search
CPC ........ H04W 76/40; H04W 76/10; H04W 4/80
See application file for complete search history.

(56) References Cited

U.S. PATENT DOCUMENTS

2005/0144195 A1   6/2005  Hesselink et al.
2008/0195620 A1*  8/2008  Abanami ................ H04L 67/04
                                              707/999.009
(Continued)

FOREIGN PATENT DOCUMENTS

CN    101615003 A    12/2009
CN    102891657 A    1/2013
(Continued)

OTHER PUBLICATIONS

Extended European search report issued in corresponding European application No. 15893539.5 dated Feb. 7, 2018.

*Primary Examiner* — Nam T Tran
(74) *Attorney, Agent, or Firm* — Young Basile Hanlon & MacFarlane, P.C.

(57) ABSTRACT

A method and a device for Bluetooth connection control for multiple playing devices, and a music playing system are provided. The method includes the following. A broadcast message is sent after a playing device is turned on, where the broadcast message is configured to inquire whether a Bluetooth function is enabled in other playing devices within the same music playing system of the playing device. Whether a response returned by the other playing devices is detected according to the broadcast message is received, where the response is configured to indicate that a playing device that returned the response has enabled the Bluetooth function. The Bluetooth function of the playing device is (Continued)

disabled when the response is received by the playing device. The Bluetooth function of the playing device is enabled when no response is received by the playing device.

20 Claims, 7 Drawing Sheets

(51) Int. Cl.
*H04W 4/80* (2018.01)
*H04W 76/10* (2018.01)
*H04W 4/06* (2009.01)

(56) References Cited

U.S. PATENT DOCUMENTS

| | | | |
|---|---|---|---|
| 2009/0061775 A1* | 3/2009 | Warren | H04L 67/04 |
| | | | 455/41.2 |
| 2009/0186580 A1 | 7/2009 | Kim | |
| 2010/0284389 A1 | 11/2010 | Ramsay et al. | |
| 2012/0099594 A1 | 4/2012 | Lau et al. | |
| 2013/0283161 A1 | 10/2013 | Reimann et al. | |
| 2016/0057602 A1* | 2/2016 | Rayanki | H04W 8/005 |
| | | | 370/254 |

FOREIGN PATENT DOCUMENTS

| | | |
|---|---|---|
| CN | 103873910 A | 6/2014 |
| CN | 104080012 A | 10/2014 |
| CN | 104469479 A | 3/2015 |
| CN | 104575539 A | 4/2015 |
| CN | 104754426 A | 7/2015 |
| CN | 105187900 A | 12/2015 |

\* cited by examiner

METHOD AND DEVICE FOR BLUETOOTH CONNECTION CONTROL FOR MULTIPLE PLAYING DEVICES, AND MUSIC PLAYING SYSTEM

CROSS-REFERENCE TO RELATED APPLICATION(S)

This application is a continuation of U.S. application Ser. No. 15/371,963, filed on Dec. 7, 2016, which is a continuation of International Application No. PCT/CN2015/096068, filed on Nov. 30, 2015, which claims the priority to Chinese patent application No. 201510490580.1, filed on Aug. 11, 2015, the disclosures of all of which are herein incorporated by reference in their entireties.

TECHNICAL FIELD

The present disclosure relates to communication technology field, and particularly to a method and a device for Bluetooth connection control for multiple playing devices, and a music playing system.

BACKGROUND

Currently, there is a music playing system including more than one playing devices which are distributed in different locations in a certain area. Through control on the playing devices within the music playing system by a terminal such as a mobile phone, one or more playing devices within the system can be selected to play local or Internet music resources, so as to provide the user with convenient listening experience.

In the process of controlling the multiple playing devices by the terminal, the playing devices and the terminal can communicate via Bluetooth®. However, the following problems may arise in the communication process: if there is a plurality of playing devices within the system and Bluetooth function of each playing device is enabled, confusion may be generated in a Bluetooth pairing process between the terminal and the playing device because too many devices that can be paired are included in a Bluetooth devices list. It is unable for the terminal to connect to a user-specified playing device quickly and accurately, thus affect the control efficiency of the terminal to the music playing system.

SUMMARY

Implementations of the disclosure provide a method and a device for Bluetooth connection control for multiple playing devices, and a music playing system.

According to a first aspect of the disclosure, a method for Bluetooth connection control for multiple playing devices is provided. The method includes the following, A broadcast message is sent after a playing device is turned on, where the broadcast message is configured to inquire whether a Bluetooth function is enabled in other playing devices within the same music playing system of the playing device. Whether a response returned by the other playing devices is detected according to the broadcast message is received, where the response is configured to indicate that a playing device that returned the response has enabled the Bluetooth function. The Bluetooth function of the playing device is disabled when the response is received by the playing device. The Bluetooth function of the playing device is enabled when no response is received by the playing device, whereby the playing device can be found by a smart terminal during a Bluetooth pairing process.

According to a second aspect of the disclosure, a device for Bluetooth connection control for multiple playing devices is provided. The device includes a broadcasting unit, a detecting unit, a first control unit, and a second control unit.

The broadcasting unit is configured to send a broadcast message after a playing device is turned on. The broadcast message is configured to inquire whether a Bluetooth function is enabled in other playing devices within a same music playing system of the playing device. The detecting unit is configured to detect whether a response returned by the other playing devices according to the broadcast message is received. The response is configured to indicate that a playing device that returned the response has enabled the Bluetooth function. The first control unit is configured to disable the Bluetooth function of the playing device when the response is received by the playing device. The second control unit is configured to enable the Bluetooth function of the playing device when no response is received by the playing device, whereby the playing device can be found by a smart terminal during a Bluetooth pairing process.

According to a third aspect of the disclosure, a music playing system is provided. The music playing system includes multiple playing devices and each playing device includes a device for Bluetooth connection control for multiple playing devices. The device includes a broadcasting unit, a detecting unit, a first control unit, and a second control unit.

The broadcasting unit is configured to send a broadcast message after a playing device is turned on. The broadcast message is configured to inquire whether a Bluetooth function is enabled in other playing devices within a same music playing system of the playing device. The detecting unit is configured to detect whether a response returned by the other playing devices according to the broadcast message is received. The response is configured to indicate that a playing device that returned the response has enabled the Bluetooth function. The first control unit is configured to disable the Bluetooth function of the playing device when the response is received by the playing device. The second control unit is configured to enable the Bluetooth function of the playing device when no response is received by the playing device, whereby the playing device can be found by a smart terminal during a Bluetooth pairing process.

BRIEF DESCRIPTION OF THE DRAWINGS

In order to illustrate the technical solutions of the present disclosure more clearly, a brief description of the accompanying drawings used herein is given below. Obviously, the drawings listed below are only examples and a person skilled in the art should be noted that, other drawings can also be obtained on the basis of these exemplary drawings without creative activity.

DETAILED DESCRIPTION

In the following description, for purpose of illustration instead of limitation, specific system architectures, technical details, and the like are proposed in order to provide a thorough understanding of implementations of the present disclosure. However, those skilled in the art should be noted that, technical schemes of the present disclosure can also be implemented in other implementations without these specific details. Under some circumstances, detailed description of well-known systems, devices, circuits, and methods are omitted to avoid redundancy.

Figure 1:
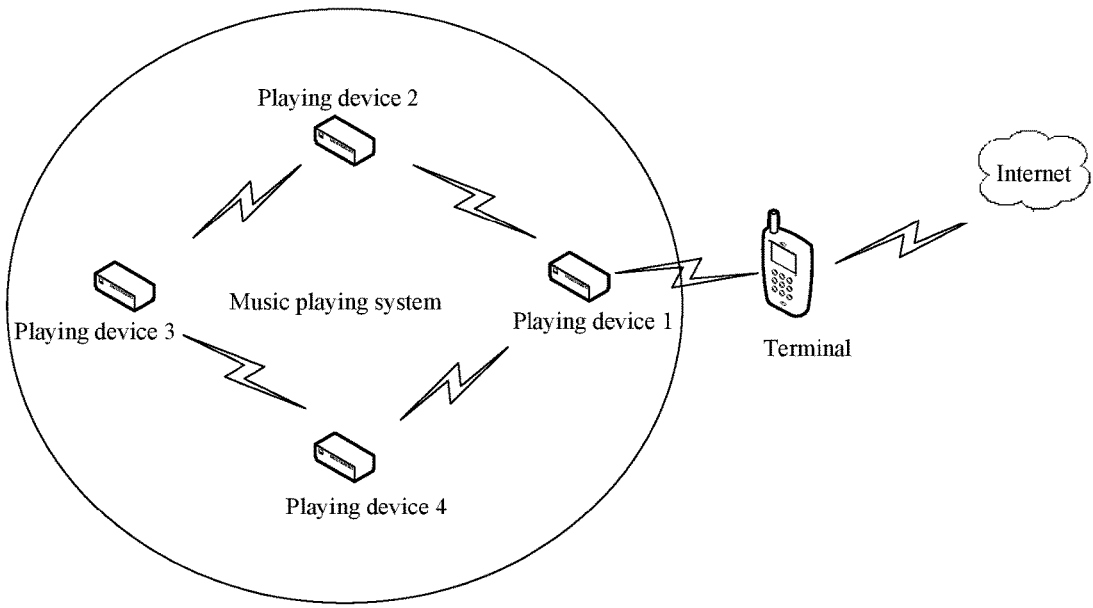
FIG. 1 is a system architecture diagram illustrating a music playing system.

To illustrate the technical schemes of the present disclosure, a music playing system including more than one playing devices will be described below. FIG. 1 is system architecture diagram of the music playing system, for convenience of description, only parts related to the present implementation are illustrated.

As illustrated in FIG. 1, the music playing system includes multiple playing devices which are distributed in different locations in a certain area and have network communication function integrated. The network communication function is wireless network communication function, for example, Wi-Fi communication function. Based on the integrated network communication function, multiple playing devices within the music playing system can form a local area network (LAN) such that playing devices in different areas can be connected and communicate with each other.

Further, the playing device is also equipped with a data transmission unit such as a Bluetooth unit, whereby the playing device and a terminal such as a smart phone can conduct pairing connection via Bluetooth. By pre-installing a control application for controlling the music playing system and connecting with a playing device within the music playing system, the terminal can achieve access and play-control on the music playing system via the connected playing device. Under the play-control of the terminal, the music playing system can be connected to the Internet and acquire Internet music resources; that is, with the help of the Internet function, the terminal can acquire music data from the Internet and push the same to the music playing system to play; otherwise, the music playing system can also play locally stored music data, for example, music data stored in an internal or external memory of the playing device, music data stored in the terminal, and music data stored in other accessible devices (for example, NAS server) in the same LAN. For example, a smart phone establishes Bluetooth connection with a playing device within a music playing system, and conducts play setting on the music playing system via the connected playing device, for example, three playing devices within the music playing system are set to play music synchronously. When the smart phone uses a music player thereof to play a song, the music data being played will be transmitted to the connected playing device via Bluetooth, and then the connected playing device will in turn push the music data to the other two playing devices via LAN, such that these three playing devices will play the song synchronously with the smart phone.

A plurality of playing devices within the music playing system can be divided into several groups and each group is configured to play different music data respectively; these groups can be play-controlled by the same or different terminal. For example, there are six playing devices in a music playing system, that is, Playing Devices A, B, C, D, E, and F, among which Playing Devices A and B constitute Playing Group 1, Playing Devices C and D constitute Playing Group 2, and Playing Devices E and F constitute Playing Group 3. Playing Devices A and B in Group 1 will play the same song synchronously, Playing Devices C and D in Group 2 will play the same song synchronously, and similarly, Playing Devices E and F in Group 3 will play the same song synchronously. However, these three groups are independent of each other and they can play the same or different song. These groups can be controlled by the same or different terminal.

The data transmission connection control and device according to implementations of the present disclosure will be described in detail below based on the music playing system described above.

It should be noted that, "data transmission" referred to herein can be implemented through Bluetooth, Point-to-Point (P2P), Infra-red, 2.4 GHz, and other technology similar to Bluetooth. For ease of explanation, take Bluetooth as an example hereinafter, and correspondingly, take "Bluetooth connection" as an example of "data transmission connection", take "Bluetooth function" as an example of "data transmission function", take "Bluetooth pairing" as an example of "data transmission pairing", take "Bluetooth status information" as an example of "data transmission status information", and take "Bluetooth connection control method/device" as an example of "method/device for data transmission connection control".

Figure 2A:
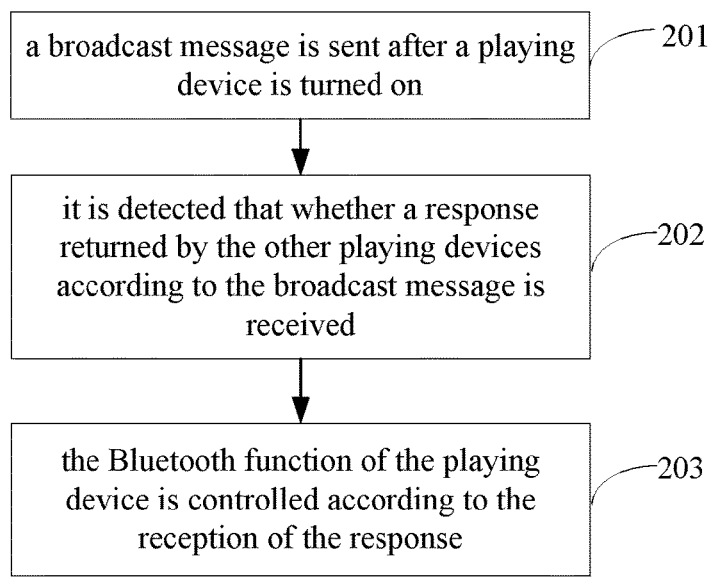
FIGS. 2A and 2B are flow charts illustrating a method for data transmission connection control for multiple playing devices according to an implementation of the present disclosure.

FIG. 2A is a flow chart illustrating a method for data transmission connection control for multiple playing devices (method for data transmission connection control for short) according to an implementation of the present disclosure, this method can be implemented by a playing device within a music playing system such as the one illustrated in FIG. 1. As illustrated in FIG. 2A, the method can begin at block 201.

At block 201, a broadcast message is sent after a playing device is turned on; the broadcast message is configured to inquire whether Bluetooth function is enabled in other playing devices within a same music playing system of the playing device.

After being turned on, each playing device will send a broadcast message in LAN of the music playing system; the broadcast message is used to inquire whether there is any Bluetooth function enabled playing device in the music playing system. A playing device, in which the Bluetooth function has been enabled and the broadcast message has been received, will return a response to inform that its Bluetooth function is enabled. Similarly, as to the playing device that sent the broadcast message, upon reception of a broadcast message(s) sent from other playing device(s) within the music playing system, a response will be returned to the other playing devices that sent the broadcast messages if the Bluetooth function of the playing device is enabled.

As an implementation of the present disclosure, in order to make all playing devices within the music playing system can receive the broadcast message and ensure the reliability of broadcast communication, the process executed at block 201 can be implemented by sending the broadcast message continuously for a predetermined number of times at first preset time intervals.

For example, the broadcast message can be sent three times at intervals of 200 ms, so as to avoid misjudgment caused by failure transmission of the broadcast message because of network transmission delay or packet loss.

At block 202, it is detected that whether a response returned by the other playing devices according to the broadcast message is received, and the response is configured to indicate that a playing device sent the response has enabled the Bluetooth function.

At block 203, the Bluetooth function of the playing device is controlled according to the reception of the response detected at block 202.

Figure 2B:
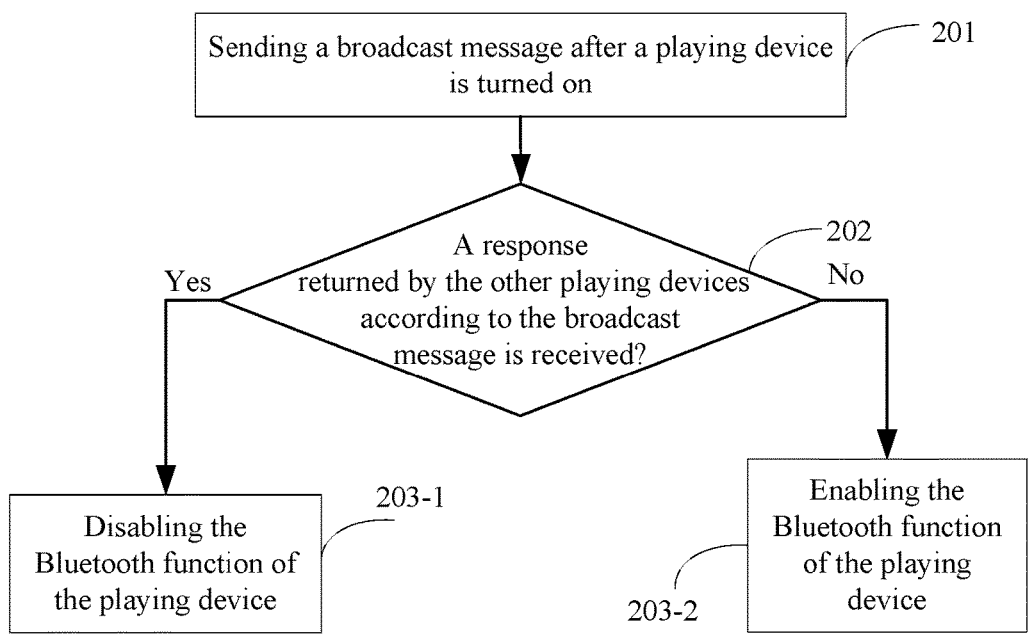

As illustrated in FIG. 2B, at block 203-1, the Bluetooth function of the playing device is disabled if the response is received by the playing device; at block 203-2, the Bluetooth function of the playing device is enabled if no response is received by the playing device, whereby the playing device can be found by the terminal during a Bluetooth pairing process.

After sending the broadcast message, if a response returned by another playing device(s) within the same music playing system is received, it indicates that there is a Bluetooth function enabled playing device within the music playing system, and at this time, the current playing device (that is, the playing device sent the broadcast message) will be controlled to disable or turn off the Bluetooth function; if no response returned by another playing device(s) within the same music playing system is received, it indicates that there is no Bluetooth function enabled playing device within the music playing system, and at this time, the current playing device will be controlled to enable the Bluetooth function.

Furthermore, the detection process of block 202 can be performed at a predetermined time after the broadcast message is sent by the playing device so as to ensure that the response can be successfully received prior to detection and guarantee the accuracy of detection.

With aid of the technical schemes of the present disclosure, there will be always only one Bluetooth function enabled playing device. In such a manner, only one playing device of the music playing system will be illustrated on the Bluetooth device list, and during the Bluetooth pairing process, the terminal can connect to the playing device quickly and accurately, whereby control efficiency of the music playing system can be improved.

Figure 3A:
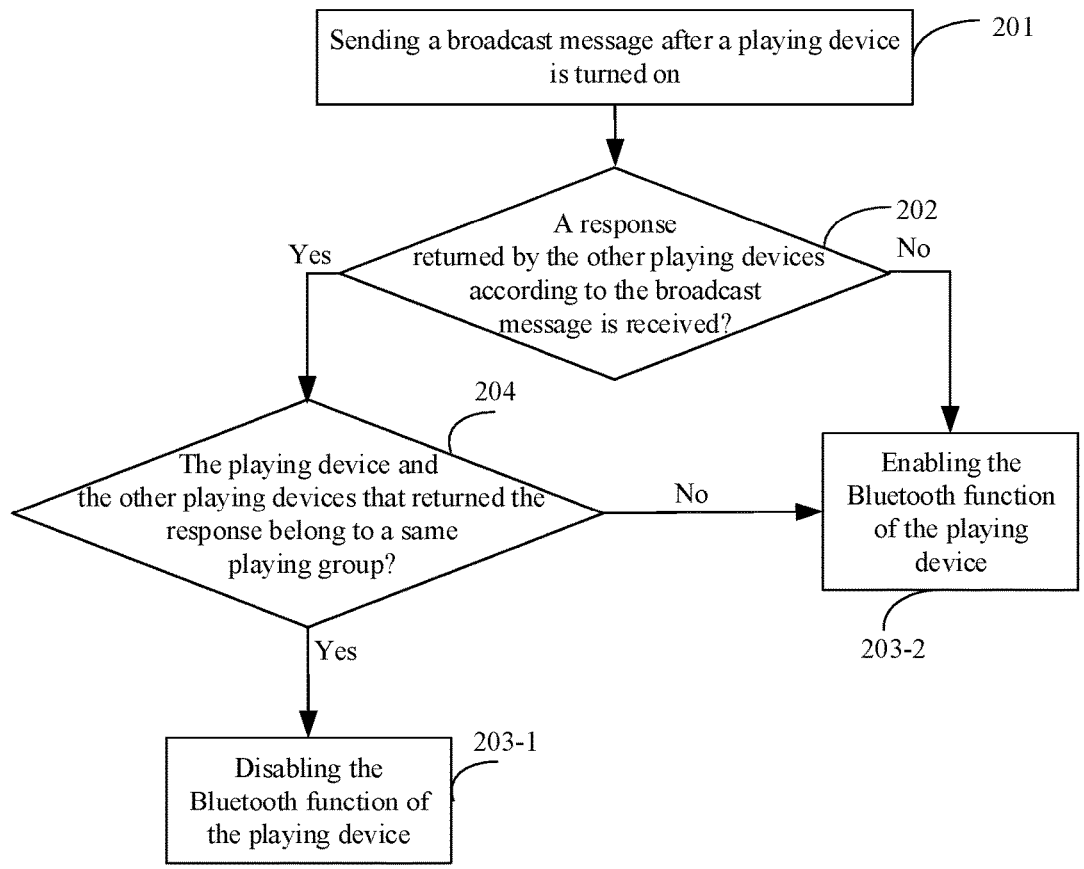
FIG. 3A is a flow chart illustrating a method for data transmission connection control for multiple playing devices according to another implementation of the present disclosure.

According to another implementation of the present disclosure, for a music playing system including a plurality of playing groups, among which each group including one or more playing devices, as illustrated in FIG. 3A, when determining whether to enable the Bluetooth function, in addition to the reception of the response, a judgment that whether the playing device and the other playing devices that returned the response belong to the same playing group will also be taken into consideration.

As illustrated in FIG. 3A, if it is determined that the response is received by the playing device at block 202, then at block 204, it is further determined that whether the playing device and the other playing devices that returned the response belong to the same playing group. If yes, proceed to block 203-1 to disable the Bluetooth function of the playing device; otherwise, proceed to block 203-2 to enable the Bluetooth function of the playing device.

In each playing device, the information of a playing group that the playing device belongs to will be pre-set. The information includes playing group name, name of the playing device within the playing group, and the like; the response returned by other playing device(s) carries IP address of the playing device returning the response, playing group name or playing device name, and so on. By analyzing information carried in the response and locally stored playing group information, it can be determined that whether the current playing device and the playing device returning the response belong to the same playing group.

If the current playing device and the other playing device(s) that returned the response belong to the same playing group, it indicates that there is a Bluetooth function enabled playing device within the music playing system, then at this time, the current playing device will be controlled to disable or turn off the Bluetooth function; if the current playing device and the other playing device(s) returning the response do not belong to the same playing group, it indicates that there is no Bluetooth function enabled playing device within the music playing system, and at this time, the current playing device will be controlled to enable the Bluetooth function.

In a scenario of multiple playing groups, the above mentioned technical scheme can ensure that there is always only one Bluetooth enabled playing device within each playing group at the same time; in such a manner, it is convenient for the terminal to connect to a playing device in a corresponding playing group quickly and accurately, and control efficiency of the music playing system can be improved.

In one implementation, if the process of block 203-2 is performed, then after the Bluetooth function is enabled, the method can further include: the name of a Bluetooth unit of the playing device is set to be the name of the playing group that the playing device belongs to.

That is, based on pre-stored playing group information, the current playing device can set the name of the Bluetooth unit thereof to be the name of the playing group it belongs to; or, if the playing device does not belong to any playing group or the playing group it belongs to has not been named, the playing device will set the name of the Bluetooth unit thereof to be the device name of its own. By setting the name of the Bluetooth unit to be the playing group name, the terminal can be navigated to a playing group to be synchronously play-controlled more quickly and accurately in a Bluetooth pairing process, and operating efficiency of the music playing system can be further improved.

In the working process of the music playing system, individual playing devices are located in different locations. With the movement of the terminal, distance between the terminal and a Bluetooth connected playing device thereof may become more and more distant or even beyond the range of Bluetooth communication, this may led to poor transmission quality or unstable connection, discontinuous or interrupted music playing; as a consequence, playing effect of music will be affected. Take into consideration the above questions, in one implementation, the following technical schemes are proposed.

In the playing device, if the Bluetooth function is enabled, it will send Bluetooth status information to other playing devices successively at second preset time intervals.

On the other hand, in the playing device, if the Bluetooth function is disabled and no Bluetooth status information is received from other playing devices, the Bluetooth function of the playing device will be enabled.

That is, as to the current playing device, if the Bluetooth function is enabled, the device will send the Bluetooth status information to other playing devices located in the same music playing system or the same playing group every second preset time interval. The Bluetooth status information is configured to indicate that the Bluetooth function of the playing device is operating normally. If the Bluetooth function is disabled or in an abnormal operating condition, no Bluetooth status information will be sent. For example, a playing group of a music playing system includes playing devices A, B, C, and D, and the Bluetooth function is enabled in the playing device A. In this case, the playing device A sends the Bluetooth status information to the playing device B in the first place; 100 ms after sending, the playing device A sends the Bluetooth status information to the playing device C; 100 ms after sending, the playing device A sends the Bluetooth status information to the playing device D; a further 100 ms after sending, the playing device A sends the Bluetooth status information to the playing device B again, so the cycle continues. According to a maximum number of playing devices that can be accommodated in a playing group, the period during which the Bluetooth status information will be sent to all playing devices subsequently needs to meet the following condition: Period>=(Second preset time interval*(maximum number of playing devices in a playing group−1)), this period can be adjusted according to the actual number of the playing devices included in the playing group.

If the Bluetooth function is disabled in the current playing device, the device will monitor whether there is Bluetooth status information sent from other playing devices in the playing group; if no Bluetooth status information from any other playing device is received within a certain time period (for example, 5 periods), it indicates that in the playing group, a playing device that connected with the terminal originally has turned off or there is network interruption. The current playing device will enable the Bluetooth function so as to maintain Bluetooth connection with the terminal, and control on the music playing system by the terminal can be achieved. Since the Bluetooth status information is sent to an individual playing device every predetermined time interval, therefore, generally there will be such a playing device, which will first detect the break of the originally Bluetooth connection and can enable its Bluetooth function prior to the next playing device can detect the break of the originally Bluetooth connection, this can ensure uninterrupted connection with the terminal.

In one implementation, the method can further include: if the playing device receive a disable-instruction while the Bluetooth function thereof is enabled, designate one playing device in the playing group to enable the Bluetooth function.

The disable-instruction is configured to instruct the playing device to enter into a standby mode or exit the playing group or the music playing system. As to the playing device, if the disable-instruction is received while the Bluetooth function has been enabled, before the disable-instruction is executed, it will choose (randomly choose or choose based on a chosen algorithm) a playing device from the playing group to enable the Bluetooth function so as to ensure continuity of connection with the terminal.

Figure 3B:
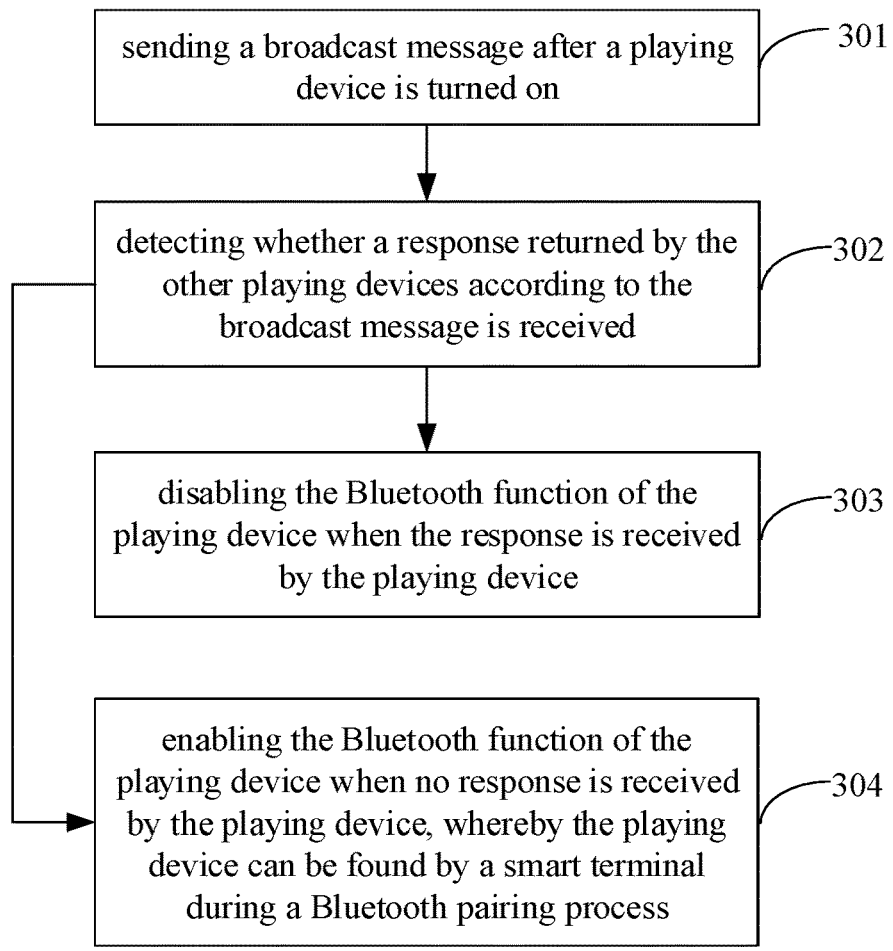
FIG. 3B is a flow chart illustrating a method for Bluetooth connection control for multiple playing devices according to another implementation of the present disclosure.

FIG. 3B is a flow chart illustrating a method for Bluetooth connection control for multiple playing devices according to another implementation of the present disclosure. As illustrated in FIG. 3B, the method begins at block 301.

At block 301, a broadcast message is sent after a playing device is turned on. The broadcast message is configured to inquire whether a Bluetooth function is enabled in other playing devices within a same music playing system of the playing device.

At block 302, whether a response returned by the other playing devices is detected according to the broadcast message is received. The response is configured to indicate that a playing device that returned the response has enabled the Bluetooth function.

At block 303, the Bluetooth function of the playing device is disabled when the response is received by the playing device.

At block 304, the Bluetooth function of the playing device is enabled when no response is received by the playing device, whereby the playing device can be found by a smart terminal during a Bluetooth pairing process.

As one implementation, the method further includes the following. A response to the other playing devices that sent a broadcast message is returned when the playing device receives the broadcast message sent by the other playing devices and the Bluetooth function of the other playing devices is enabled.

As one implementation, the music playing system includes a plurality of playing groups and each playing group includes one or more playing devices. The Bluetooth function of the playing device is disabled when the response is received by the playing device as follows. Whether the playing device that sent the broadcast message and the other playing devices that returned the response belong to a same playing group is determined. The Bluetooth function of the playing device that sent the broadcast message is disabled based on a determination that the playing device that sent the broadcast message and the other playing devices that returned the response belong to the same playing group. The Bluetooth function of the playing device that sent the broadcast message is enabled based on a determination that the playing device that sent the broadcast message and the other playing devices that returned the response do not belong to the same playing group, whereby the playing device that sent the broadcast message can be found by the smart terminal during a Bluetooth pairing process.

As one implementation, after the Bluetooth function of the playing device that sent the broadcast message is enabled based on a determination that the playing device that sent the broadcast message and the other playing devices that returned the response do not belong to the same playing group, the method further includes the following. The name of a Bluetooth module of the playing device that sent the broadcast message is set to be the name of the playing group to which the playing device belongs.

As one implementation, the broadcast message is sent after the playing device is turned on as follows. The broadcast message is sent continuously for a predetermined number of times at first preset time intervals.

As one implementation, the method further includes the following. Bluetooth status information is sent to the other playing devices successively at second preset time intervals when the Bluetooth function of the playing device is enabled. The Bluetooth function of the playing device is enabled when the Bluetooth function of the playing device is disabled and no Bluetooth status information from the other playing devices is received, where the Bluetooth status information is configured to indicate that the Bluetooth function of a playing device that sent the Bluetooth status information is operating normally.

As one implementation, the method further includes the following. One playing device among the other playing devices is designated to enable the Bluetooth function when the playing device receives a disable-instruction and the Bluetooth function of the playing device is enabled.

It should be understood that numbers of steps in the above-described implementations does not mean the sequential order of execution and should not be comprehend as any limitation to the present disclosure. The sequential order of execution of steps should be determined by their functionality and inherent logic.

Corresponding to the method for data transmission connection control according to implementations described above, FIG. 4 illustrates a block diagram of a device for data transmission connection control for multiple playing devices (device for data transmission connection control for short) according to an implementation of the present disclosure; the device can be a software element, a hardware element, or a software/hardware combined element build in a playing device or an application system of the playing device. For ease of illustration, only related parts are illustrated below.

Figure 4:
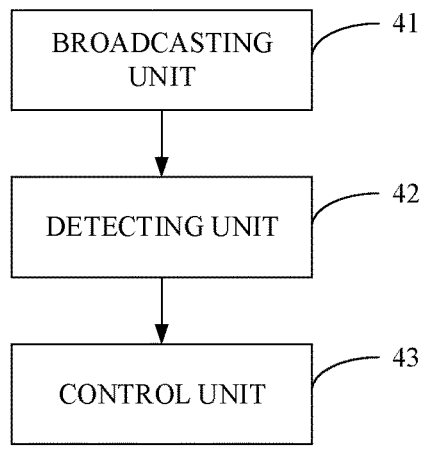
FIG. 4 is a block diagram illustrating a device for data transmission connection control for multiple playing devices according to an implementation of the present disclosure.

As illustrated in FIG. 4, the device for data transmission connection control includes a broadcasting unit 41, a detecting unit 42, and a control unit 43, which will be described in detail below.

The broadcasting unit 41, which can be implemented as a transmitter, is configured to send a broadcast message after a playing device is turned on; the broadcast message is configured to inquire whether Bluetooth function is enabled in other playing devices within a same music playing system of the playing device.

The detecting unit 42 can be implemented as a detector, and is configured to detect whether a response returned by the other playing devices according to the broadcast message is received, the response is configured to indicate that a playing device sent the response has enabled the Bluetooth function. For example, the response can be received by a receiver 40 built into the playing device. Or, the receiver and the transmitter used as the broadcasting unit 41 can be integrated into one element such as a transceiver.

The control unit 43 can be implemented as a controller and is configured to control the Bluetooth function of the playing device based on the reception of the response determined by the detecting unit. As one implementation, if the reception is received by the playing device, the Bluetooth function thereof will be disabled; otherwise, if no response is received by the playing device, the Bluetooth function thereof will be enabled, whereby the playing device can be found by a terminal during a Bluetooth pairing process. As one implementation, the control unit can be separated into two controlling sub-units, among which one is configured to enable the Bluetooth function, while the other is configured to disable the Bluetooth function, and the present disclosure is not limited thereto.

In one implementation, the device for data transmission connection control can further include a responding unit 44, which can be implemented as a transmitter and is configured to return a response to other playing devices if broadcast messages from the other playing devices are received (for example, can be received by receiver 40) and the Bluetooth function of the playing device is enabled. Similarly, the responding unit 44 and the broadcasting unit 41 can be integrated into one hardware element such as a transceiver.

In one implementation, the music playing system includes a plurality of playing groups, and each playing group includes one or more playing devices.

Figure 5:
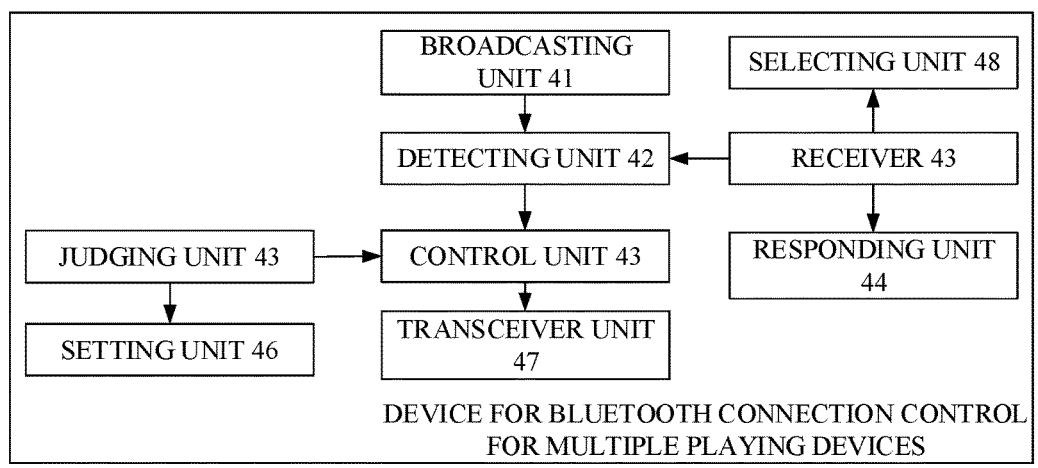
FIG. 5 is a block diagram illustrating the structure of the device for data transmission connection control for multiple playing devices according to another implementation of the present disclosure.

As illustrated in FIG. 5, in one implementation, the device for data transmission connection control further includes a judging unit 45, which is configured to determine whether the playing device and the other playing devices that returned the response belong to the same playing group. The judging unit 45 can be a processor.

Thus, in addition to control the Bluetooth function (that is, data transmission function) based on the reception of the response as described above, the control unit 43 is further configured to control the Bluetooth function of the playing device based on the result from the judging unit 45. In more concrete terms, the control unit 43 will control the playing device to disable the Bluetooth function if the playing device and the other playing devices that returned the response belong to the same playing group, or control the playing device to enable the Bluetooth function if the playing device and the other playing devices that returned the response do not belong to the same playing group, whereby the playing device can be found by the terminal during a Bluetooth pairing process.

In one implementation, the device for data transmission connection control can further include a setting unit 46 (for example, a processor), which is configured to set the name of a Bluetooth unit of the playing device to be the name of the playing group that the playing device belongs to.

In one implementation, the broadcasting unit 41 is configured to send the broadcast message for a predetermined number of times at first preset time intervals.

As illustrated in FIG. 5, as one implementation, the device for data transmission connection control can further include: a transceiver unit 47 (for example, a transceiver), configured to send Bluetooth status information successively to the other playing devices every second preset time interval if the Bluetooth function of the playing device is enabled, and receive Bluetooth status information sent from other playing devices.

The control unit 43 is configured to enable the Bluetooth function of the playing device if no Bluetooth status information is received by the transceiver unit 47 from the other playing devices and the Bluetooth function of the playing device is disabled.

As illustrated in FIG. 5, as one implementation, the device for data transmission connection control can further include: a selecting unit 48 (for example, can be a selector), configured to designate one playing device from the other playing devices to enable the Bluetooth function if the playing device receives a disable-instruction (for example, can be received by the receiver 40) and the Bluetooth function thereof has been enabled.

Figure 6:
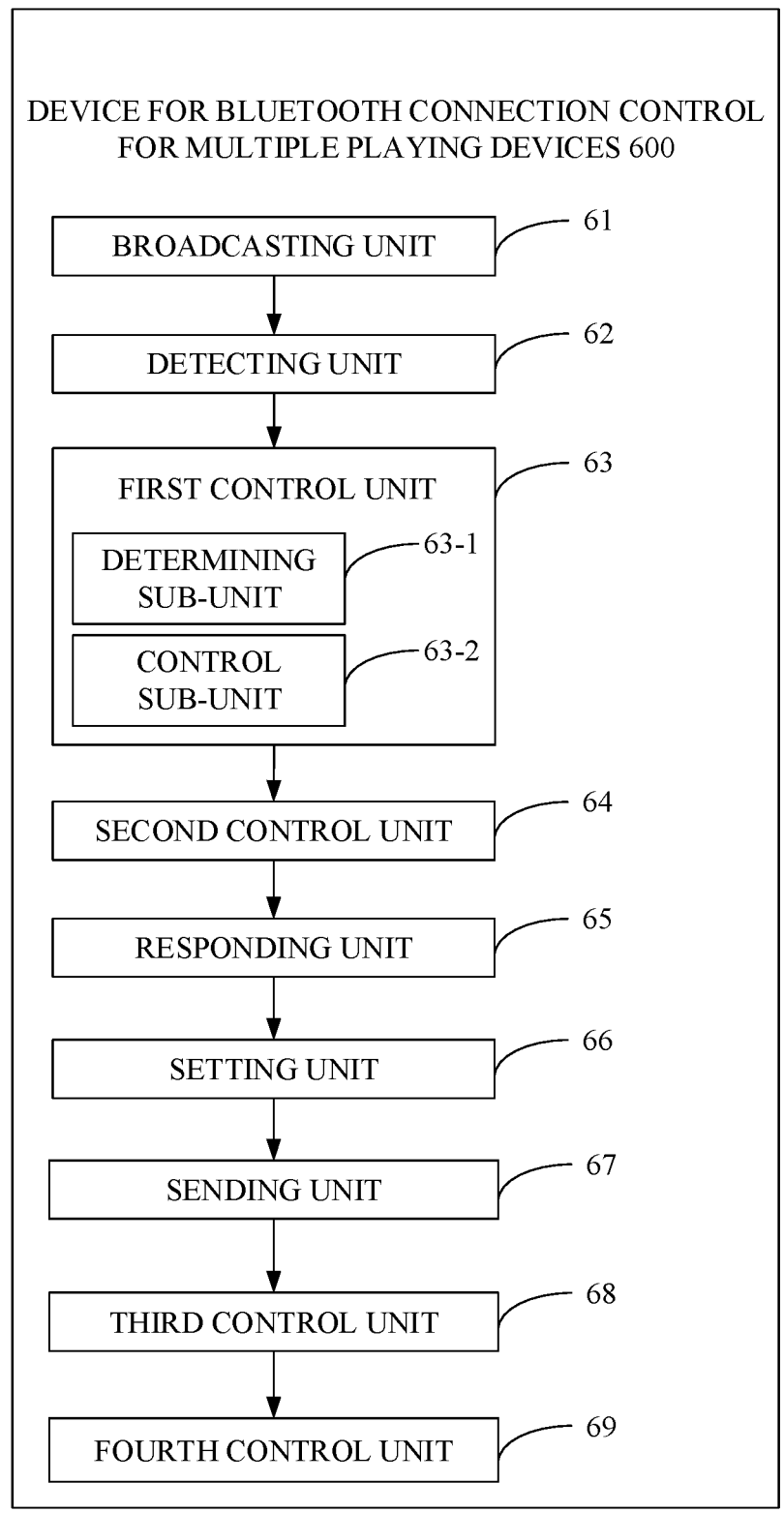
FIG. 6 is a block diagram illustrating a device for Bluetooth connection control for multiple playing devices according to yet another implementation of the present disclosure.

FIG. 6 is a block diagram illustrating a device for Bluetooth connection control for multiple playing devices 600 according to yet another implementation of the present disclosure. The device 600 can be a software element, a hardware element, or a software/hardware combined element build in a playing device or an application system of the playing device. For ease of illustration, only related parts are illustrated below. As illustrated in FIG. 6, the device 600 includes a broadcasting unit 61, a detecting unit 62, a first control unit 63, and a second control unit 64.

The broadcasting unit 61, which can be implemented as a transmitter, is configured to send a broadcast message after a playing device is turned on. The broadcast message is configured to inquire whether a Bluetooth function is enabled in other playing devices within a same music playing system of the playing device. The detecting unit 62 can be implemented as a detector, and is configured to detect whether a response returned by the other playing devices according to the broadcast message is received. The response is configured to indicate that a playing device that returned the response has enabled the Bluetooth function. The first control unit 63 is configured to disable the Bluetooth function of the playing device when the response is received by the playing device. The second control unit 64 is configured to enable the Bluetooth function of the playing device when no response is received by the playing device, whereby the playing device can be found by a smart terminal during a Bluetooth pairing process. The first control unit 63 and the second control unit 64 can be implemented as controllers. As one implementation, the first control unit 63 and the second control unit 64 can be integrated into a control unit, which is configured to enable or disable the Bluetooth function, and the present disclosure is not limited thereto.

As one implementation, the device 600 further includes a responding unit 65. The responding unit 65 which can be implemented as a transmitter and is configured to return a response to the other playing devices that sent a broadcast message when the playing device receives the broadcast message sent by the other playing devices and the Bluetooth function of the other playing devices is enabled. Similarly, the responding unit 65 and the broadcasting unit 61 can be integrated into one hardware element such as a transceiver.

As one implementation, the music playing system includes a plurality of playing groups and each playing group comprises one or more playing devices and the first control unit 63 includes a determining sub-unit 63-1 and a control sub-unit 63-2. The determining sub-unit 63-1 is configured to determine whether the playing device that sent the broadcast message and the other playing devices that returned the response belong to the same playing group. The control sub-unit 63-2 is configured to disable the Bluetooth function of the playing device that sent the broadcast message when the determining sub-unit determines that the playing device that sent the broadcast message and the other playing devices that returned the response belong to the same playing group, or to enable the Bluetooth function of the playing device that sent the broadcast message when the determining sub-unit determines that the playing device that sent the broadcast message and the other playing devices that returned the response do not belong to the same playing group, whereby the playing device that sent the broadcast message can be found by the smart terminal during a Bluetooth pairing process.

As one implementation, the device 600 further includes a setting unit 66. The setting unit 66 (for example, a processor) is configured to set the name of a Bluetooth module of the playing device that sent the broadcast message to be the name of the playing group to which the playing device that sent the broadcast message belongs.

As one implementation, the broadcasting unit 61 is configured to send the broadcast message continuously for a predetermined number of times at first preset time intervals.

As one implementation, the device 600 further includes a sending unit 67 (for example, a transmitter, a transceiver, or the like) and a third control unit 68 (for example, a controller). The sending unit 67 is configured to send Bluetooth status information to the other playing devices successively at second preset time intervals when the Bluetooth function of the playing device is enabled. The third control unit 68 is configured to enable the Bluetooth function of the playing device when the Bluetooth function of the playing device is disabled and no Bluetooth status information from the other playing devices is received, wherein the Bluetooth status information is configured to indicate that the Bluetooth function of a playing device that sent the Bluetooth status information is operating normally.

As one implementation, the device 600 further includes a fourth control unit 69 (for example, a controller). The fourth control unit 69 is configured to designate one playing device among the other playing devices to enable the Bluetooth function when the playing device receives a disable-instruction and the Bluetooth function of the playing device is enabled.

Figure 7:
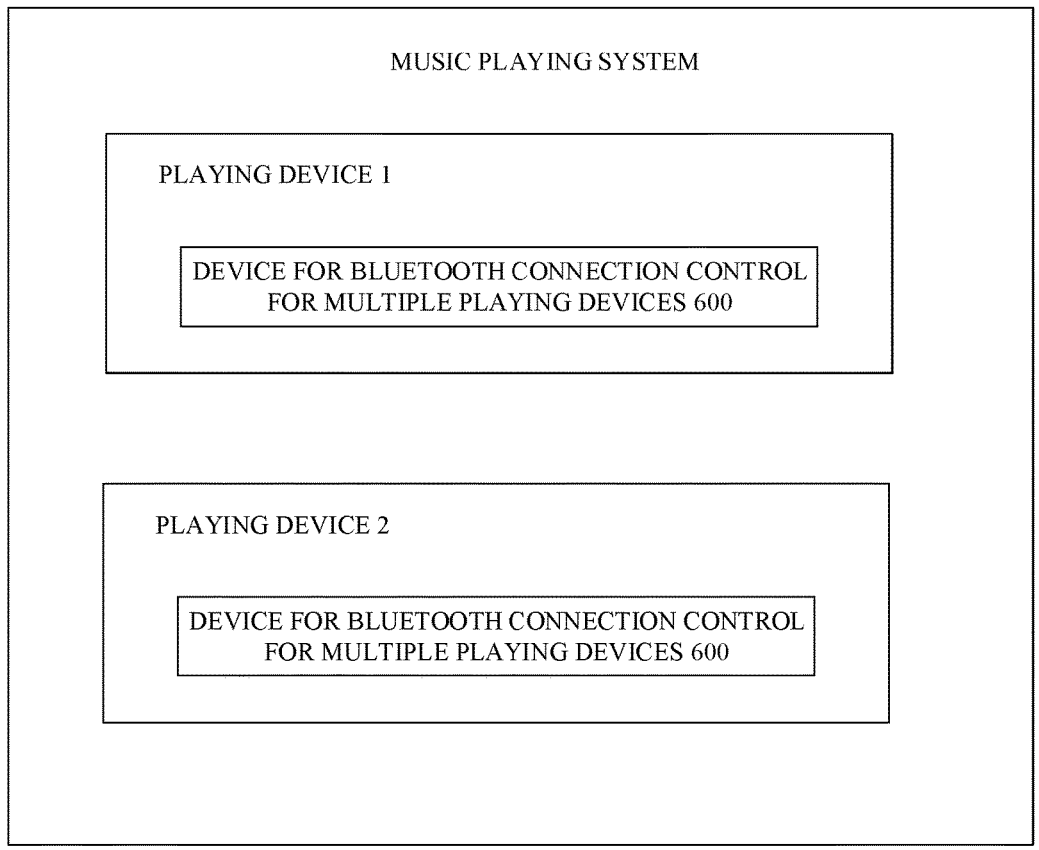
FIG. 7 is a system architecture diagram illustrating another music playing system.

FIG. 7 is a system architecture diagram illustrating another music playing system. As illustrated in FIG. 7, the music playing system includes multiple playing devices (for example, playing device 1 and playing device 2) and each playing device includes the device for Bluetooth connection control for multiple playing devices 600 illustrated in FIG. 6.

Those skilled in the art will be able to understand that, for simplicity and ease of description, the division of functional units or modules are illustrated as an example; in practical applications, functions described above can be assigned to different functional units or modules according to actual needs, that is, the internal structure of the device can be divided into different functional units or modules to achieve all or part of the functions described above. For example, each functional unit or module can be integrated into a processing unit or can be a separate physical existence or, two or more functional units or modules can be integrated into one unit, and the integrated unit can be realized in the form of hardware or software functional unit. Additionally, the name of each functional unit or module is only used to facilitate the distinction of one another and is not intended to limit the scope of the present disclosure. Working process of the units or modules in the Bluetooth connection control device can refer to corresponding process of the aforementioned method according to the implementation of the present disclosure, and will not go into much detail here.

A person skilled in the art will understand that, exemplary units or algorithm steps described in the implementations disclosed can be achieved via electronic hardware or a combination of electronic hardware and computer software. Whether hardware or software should be adopted depends on design constraints and specific application of technical schemes. Different methods or manners can be adopted to achieve the function described in the implementations for respective specific applications, which will fall into the protection scope of the present disclosure It should be understood that the devices and methods disclosed in the present disclosure can be implemented in other ways. For example, the above-described device implementations are merely illustrative; the division of units or modules is just a logic function division, and there can be other division manner in practical applications, for example, a plurality of units or components can be combined or integrated into another system, or some features can be omitted or not implemented. Moreover, "coupling", "direct coupling" or "communication connection" referred to herein can be indirect coupling or communication connection via interfaces, devices, or units, or can be electrical, mechanical, or other forms of connection.

Units described as separate components can be physically separated from each other; components displayed as units can be physical units, i.e., can be located in one place or can be distributed on multiple network units. Part or all of the units can be selected to achieve the purpose of implementations of the present disclosure according to actual needs.

Additionally, in the implementations of the present disclosure, each functional unit can be integrated in one processing unit or can be separated physically, or two or more units can be integrated into one unit. The integrated units described above can be implemented in the form of hardware or software.

The integrated units, when achieved in the form of software functional units and can be sold or used as an independent product, can be stored in computer readable storage medium. According to this, all or a part of the technical schemes of the present disclosure can be embodied in the form of software products which can be stored in a storage medium. The storage medium can be configured to store instructions, when executed on a data-processing apparatus (can be personal computer, server, or network equipment), adapted to perform the all or a part of the methods as described in the above-mentioned implementations. The storage medium described above includes USB-stick, mobile hard disk drive, Read-Only Memory (ROM), Random Access Memory (RAM), disk or CD, and any other medium that can be used to store program code.

The foregoing descriptions are merely exemplary implementations of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for Bluetooth connection control for multiple playing devices, comprising:
    sending a broadcast message after a first playing device is turned on, the broadcast message being configured to inquire whether a Bluetooth function is enabled in other playing devices within a same music playing system of the playing device;
    detecting whether a response returned by a second playing device of the other playing devices according to the broadcast message is received, the response being configured to indicate that the second playing device has enabled the Bluetooth function;
    disabling the Bluetooth function of the first playing device when the response is received by the first playing device; and
    enabling the Bluetooth function of the first playing device when no response is received by the first playing device, whereby the first playing device can be found by a smart terminal during a Bluetooth pairing process.

2. The method of claim 1, further comprising:
    returning, by the first playing device, a response to a third playing device of the other playing devices that sent a broadcast message, when the first playing device receives the broadcast message sent by the third playing device and the Bluetooth function of the first playing device is enabled.

3. The method of claim 1, wherein the music playing system comprises a plurality of playing groups and each playing group comprises one or more playing devices; wherein the disabling the Bluetooth function of the first playing device when the response is received by the first playing device comprises:
    determining whether the first playing device and the second playing device belong to the same playing group;
    disabling the Bluetooth function of the first playing device based on a determination that the first playing device and the second playing device belong to the same playing group; or
    enabling the Bluetooth function of the first playing device based on a determination that the first playing device and the second playing device do not belong to the same playing group, whereby the first playing device can be found by the smart terminal during a Bluetooth pairing process.

4. The method of claim 3, wherein the method further comprises the following after the enabling the Bluetooth function of the first playing device based on the determination that the first playing device and the second playing device do not belong to the same playing group:
    setting a name of a Bluetooth module of the first playing device to be a name of the playing group to which the first playing device belongs.

5. The method of claim 1, wherein sending the broadcast message after the playing device is turned on comprises:
    sending the broadcast message continuously for a predetermined number of times at first preset time intervals.

6. The method of claim 1, further comprising:
    sending Bluetooth status information to the other playing devices successively at second preset time intervals when the Bluetooth function of the playing device is enabled; and
    enabling the Bluetooth function of the playing device when the Bluetooth function of the playing device is disabled and no Bluetooth status information from the other playing devices is received, wherein the Bluetooth status information is configured to indicate that the Bluetooth function of a playing device that sent the Bluetooth status information is operating normally.

7. The method of claim 1, further comprising:
    designating one playing device among the other playing devices to enable the Bluetooth function when the playing device receives a disable-instruction and the Bluetooth function of the playing device is enabled.

8. A device for Bluetooth connection control for multiple playing devices, disposed in a first playing device and comprising:
    one or more processors; and
    a memory, configured to store one or more programs, wherein when executed by the one or more processors, the one or more programs are adapted to cause the one or more processors to:
    send a broadcast message after the first playing device is turned on, the broadcast message being configured to inquire whether a Bluetooth function is enabled in other playing devices within a same music playing system of the playing device;
    detect whether a response returned by a second playing device of the other playing devices according to the broadcast message is received, the response being configured to indicate that the second playing device has enabled the Bluetooth function;
    disable the Bluetooth function of the first playing device when the response is received by the first playing device; and
    enable the Bluetooth function of the first playing device when no response is received by the first playing device, whereby the first playing device can be found by a smart terminal during a Bluetooth pairing process.

9. The device of claim 8, wherein when executed, the one or more programs are adapted to further cause the one or more processors to:
    return a response to a third playing device of the other playing devices that sent a broadcast message, when the first playing device receives the broadcast message sent by the third playing device and the Bluetooth function of the first playing device is enabled.

10. The device of claim 8, wherein the music playing system comprises a plurality of playing groups and each playing group comprises one or more playing devices, wherein the one or more programs to disable the Bluetooth function of the first playing device comprise programs to:
determine whether the first playing device and the second playing device belong to the same playing group; and
disable the Bluetooth function of the first playing device when the first playing device and the second playing device belong to the same playing group, or to enable the Bluetooth function of the first playing device when the first playing device and the second playing device do not belong to the same playing group, whereby the first playing device can be found by the smart terminal during a Bluetooth pairing process.

11. The device of claim 10, wherein when executed, the one or more programs are adapted to further cause the one or more processors to:
set a name of a Bluetooth module of the first playing device to be a name of the playing group to which the first playing device belongs.

12. The device of claim 8, wherein the one or more programs to send the broadcast message comprise programs to: send the broadcast message continuously for a predetermined number of times at first preset time intervals.

13. The device of claim 8, wherein when executed, the one or more programs are adapted to further cause the one or more processors to:
send Bluetooth status information to the other playing devices successively at second preset time intervals when the Bluetooth function of the playing device is enabled; and
enable the Bluetooth function of the playing device when the Bluetooth function of the playing device is disabled and no Bluetooth status information from the other playing devices is received, wherein the Bluetooth status information is configured to indicate that the Bluetooth function of a playing device that sent the Bluetooth status information is operating normally.

14. The device of claim 8, wherein when executed, the one or more programs are adapted to further cause the one or more processors to:
designate one playing device among the other playing devices to enable the Bluetooth function when the playing device receives a disable-instruction and the Bluetooth function of the playing device is enabled.

15. A non-transitory computer readable storage medium storing a computer program which, when executed by a processor, causes the processor to carry out actions comprising:
sending a broadcast message after a first playing device is turned on, the broadcast message being configured to inquire whether a Bluetooth function is enabled in other playing devices within a same music playing system of the playing device;
detecting whether a response returned by a second playing device of the other playing devices according to the broadcast message is received, the response being configured to indicate that the second playing device has enabled the Bluetooth function;
disabling the Bluetooth function of the first playing device when the response is received by the first playing device; and
enabling the Bluetooth function of the first playing device when no response is received by the first playing device, whereby the first playing device can be found by a smart terminal during a Bluetooth pairing process.

16. The non-transitory computer readable storage medium of claim 15, wherein the computer program, when executed by the processor, further causes the processor to carry out actions comprising:
returning a response to a third playing device of the other playing devices that sent a broadcast message, when the first playing device receives the broadcast message sent by the third playing device and the Bluetooth function of the first playing device is enabled.

17. The non-transitory computer readable storage medium of claim 15, wherein the music playing system comprises a plurality of playing groups and each playing group comprises one or more playing devices; wherein the computer program executed by the processor to carry out the action of disabling the Bluetooth function of the first playing device is executed by the processor to carry out actions comprising:
determining whether the first playing device and the second playing device belong to the same playing group;
disabling the Bluetooth function of the first playing device based on a determination that the first playing device and the second playing device belong to the same playing group; or
enabling the Bluetooth function of the first playing device based on a determination that the first playing device and the second playing device do not belong to the same playing group, whereby the first playing device can be found by the smart terminal during a Bluetooth pairing process.

18. The non-transitory computer readable storage medium of claim 17, wherein the computer program, when executed by the processor, further causes the processor to carry out actions comprising:
setting a name of a Bluetooth module of the first playing device to be a name of the playing group to which the first playing device belongs.

19. The non-transitory computer readable storage medium of claim 15, wherein the computer program executed by the processor to carry out the action of sending the broadcast message is executed by the processor to carry out actions comprising:
sending the broadcast message continuously for a predetermined number of times at first preset time intervals.

20. The non-transitory computer readable storage medium of claim 15, wherein the computer program, when executed by the processor, further causes the processor to carry out actions comprising:
sending Bluetooth status information to the other playing devices successively at second preset time intervals when the Bluetooth function of the playing device is enabled; and
enabling the Bluetooth function of the playing device when the Bluetooth function of the playing device is disabled and no Bluetooth status information from the other playing devices is received, wherein the Bluetooth status information is configured to indicate that the Bluetooth function of a playing device that sent the Bluetooth status information is operating normally.

* * * * *